US010070345B2

(12) United States Patent
Townend et al.

(10) Patent No.: US 10,070,345 B2
(45) Date of Patent: Sep. 4, 2018

(54) METHOD AND CORRESPONDING WIRELESS ACCESS POINT FOR ADJUSTING DATA RATE OF SECONDARY USERS (71) Applicant: British Telecommunications Public Limited Company, London (GB)

(72) Inventors: David Paul Townend, London (GB); Simon Patrick Alexander Ringland, London (GB); Francis James Scahill, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/104,283

(22) PCT Filed: Dec. 16, 2014

(86) PCT No.: PCT/GB2014/053705
§ 371 (c)(1),
(2) Date: Jun. 14, 2016

(87) PCT Pub. No.: WO2015/101769
PCT Pub. Date: Jul. 9, 2015

(65) Prior Publication Data
US 2017/0006504 A1     Jan. 5, 2017

(30) Foreign Application Priority Data
Dec. 31, 2013    (EP) ..................................... 13250135

(51) Int. Cl.
*H04W 28/22*    (2009.01)
*H04W 28/02*    (2009.01)
(Continued)

(52) U.S. Cl.
CPC ....... *H04W 28/22* (2013.01); *H04W 28/0257* (2013.01); *H04W 84/12* (2013.01); *H04W 88/02* (2013.01)

(58) Field of Classification Search
CPC . H04W 28/0257; H04W 28/22; H04W 84/12; H04W 88/02
See application file for complete search history.

(56) References Cited

U.S. PATENT DOCUMENTS

2004/0165563 A1    8/2004  Hsu et al.
2005/0047343 A1    3/2005  Sharony et al.
(Continued)

FOREIGN PATENT DOCUMENTS

EP    2424281 A1    2/2012

OTHER PUBLICATIONS

PCT International Search Report for PCT Application No. PCT/GB2014/000122, dated May 6, 2014, 3 pages.
(Continued)

*Primary Examiner* — Paul H Masur
(74) *Attorney, Agent, or Firm* — Amy M. Salmela; Patterson Thuente Pedersen, P.A.

(57) ABSTRACT

The disclosure relates to a dual network access point capable of establishing a home wireless network and a further secondary wireless network for a number of wireless devices. The first wireless network is a private home WLAN while the second wireless network is a guest network or a hotspot network. To prevent secondary network users impacting the performance of the first network, the access point monitors the devices connected to the first network and adjusts the advertised minimum supportable rate on the second network.

13 Claims, 5 Drawing Sheets (51) Int. Cl.
 *H04W 84/12* (2009.01)
 *H04W 88/02* (2009.01)

(56) References Cited

U.S. PATENT DOCUMENTS

| | | |
|---|---|---|
| 2005/0271009 A1 | 12/2005 | Shirakabe et al. |
| 2006/0146709 A1 | 7/2006 | Ginzburg |
| 2007/0124478 A1 | 5/2007 | Abdelhamid et al. |
| 2007/0291711 A1 | 12/2007 | Welch |
| 2008/0008140 A1* | 1/2008 | Forssell ............... H04W 28/16 370/338 |
| 2008/0080387 A1 | 4/2008 | Wang et al. |
| 2008/0080388 A1 | 4/2008 | Dean et al. |
| 2008/0117836 A1 | 5/2008 | Savoor et al. |
| 2008/0151751 A1 | 6/2008 | Ponnuswamy et al. |
| 2010/0080196 A1 | 4/2010 | Ho et al. |
| 2011/0243013 A1 | 10/2011 | Lee et al. |
| 2011/0305180 A1 | 12/2011 | Osterling |
| 2012/0224484 A1 | 9/2012 | Babiarz et al. |
| 2012/0314571 A1 | 12/2012 | Forssell |
| 2013/0295989 A1 | 11/2013 | Smadi |
| 2016/0043953 A1 | 2/2016 | Ringland et al. |
| 2016/0057290 A1 | 2/2016 | Punwani et al. |
| 2016/0066227 A1 | 3/2016 | Townend |

OTHER PUBLICATIONS

Romdhani et al., Adaptive EDCF: Enhanced Service Differentiation for IEEE 802.11 Wireless Ad-Hoc Networks, Sophia Antipolis, France, 2004, 6 pages.

Veres et al, "Supporting Service Differentiation in Wireless Packet Networks Using Distributed Control", IEEE, vol. 19, No. 10, Oct. 2001, 13 pages.

Jiang et al., "Proportional Fairness in Wireless LANs and Ad Hoc Networks", Chinese University of Hong Kong, 6 pages.

Hwee et al., "A Unified Qos-Inspired Load Optimization Framework for Multiple Access Points Based Wireless LANs", IEEE, May 2009, 7 pages.

Wikipedia, "Distributed Coordination Function", retrieved Sep. 28, 2015, 2 pages.

Wikipedia, "IEEE 802.11e-2005", retrieved Sep. 28, 2015, 4 pages.

BT, "BT Wi-Fi", retrieved Sep. 28, 2015, 2 pages.

ServerFault, "Huge Outgoing Traffic on Windows Azure" retrieved Sep. 28, 2015, 2 pages.

International Search Report, for PCT Application No. PCT/GB2014/000123, dated May 6, 2014, 4 pages.

Application and File History for U.S. Appl. No. 14/781,005, filed Sep. 28, 2015. Inventor: Townend.

Application and File History for U.S. Appl. No. 14/780,990, filed Sep. 28, 2015. Inventors: Ringland et al.

Murty, "Dyson: An Architecture for Extensible Wireless LANs", Microsoft Research, Harvard University, 14 pages.

International Search Report, International Application No. PCT/GB2014/053705, dated Mar. 9, 2015, 2 pages.

Mustafa, Ahsan, & Ibrahim; Pre-Scanning and Dynamic Caching for Fast Handoff at MAC Layer in IEEE 802.11 Wireless LANs; NUST University Rawalpindi, Pakistan; 8 pages.

Bhadane, Waoo, Patheja; Improving Fast and Smooth Handoff in IEEE 802.11 Wireless Networks; IJRIM vol. 2, Issue 2 (Feb. 2012) (ISSN 2231-4334); 9 pages.

* cited by examiner

METHOD AND CORRESPONDING WIRELESS ACCESS POINT FOR ADJUSTING DATA RATE OF SECONDARY USERS

PRIORITY CLAIM

The present application is a National Phase entry of PCT Application No. PCT/GB2014/053705, filed Dec. 16, 2014, which claims priority from EP Patent Application No. 13250135.4, filed Dec. 31, 2013, which is hereby fully incorporated herein by reference.

TECHNICAL FIELD

This disclosure relates to wireless data access and in particular to a method and apparatus for providing wireless access to at least two data devices.

BACKGROUND

In recent times, wireless access points have become popular means for providing data connectivity between a wired network and typically smaller, mobile wireless devices. The access points provide wireless networks operating over a radio frequency spectrum at a low transmission power typically providing a range of several meters around the access point.

It is now also fairly common for access points to support two or more wireless networks from the same device. The use of primary and secondary networks allows a form of access control by providing a guest network for visitors or for providing a public hotspot function. Typically the secondary network is less capable than the primary network, such as having a bandwidth cap on the usage of the broadband connection to the access point in terms of bandwidth, time or data limit.

Whilst this capability restriction is designed to prevent the secondary network negatively impacting quality of experience for primary network users, these measures do not alleviate problems caused due to sharing radio spectrum. Embodiments address these issues.

SUMMARY

In one aspect, an embodiment provides a method of operating a wireless access point device having a wireless network interface configured to generate a primary wireless network for a plurality of wireless client devices, and a secondary wireless network, the method comprising a wireless network controller performing the steps of: accessing a set of connection speed data rate values relating to the current connection speed of each of the plurality of wireless client devices to the primary wireless network; identifying a lowest data rate from the set of connection speed data rate values; determining a minimum connection speed value for the secondary wireless network, the minimum connection speed value being dependent on the value of the identified lowest data rate on the primary wireless network; and modifying the wireless network interface so that, when a request by a further wireless client to connect to the second network is received, the response by the wireless network interface excludes connection data rates which are lower that the determined minimum connection speed value for the secondary wireless network, such that the further wireless device will only connect to the secondary wireless network if it is able to connect at or above the determined minimum connection speed value.

In another aspect, an embodiment provides apparatus comprising: a wireless network interface configured to generate a primary wireless network for a plurality of wireless client devices, and a secondary wireless network, accessing means for accessing a set of connection speed data rate values relating to the current connection speed of each of the plurality of wireless client devices to the primary wireless network; identifying means for identifying a lowest data rate from the set of connection speed data rate values; determining means for determining a minimum connection speed value for the secondary wireless network, the minimum connection speed value being dependent on the value of the identified lowest data rate on the primary wireless network; and modifying means for modifying the wireless network interface so that, when a request by a further wireless client to connect to the second network is received, the response by the wireless network interface excludes connection data rates which are lower that the determined minimum connection speed value for the secondary wireless network, such that the further wireless device will only connect to the secondary wireless network if it is able to connect at or above the determined minimum connection speed value.

In a further aspect, an embodiment provides a wireless network system comprising: apparatus as set out in the claims having a primary wireless network and secondary wireless network; a first set of wireless client devices connected to the primary wireless network; and a second set of wireless client devices which are connectable to the secondary wireless network.

DETAILED DESCRIPTION

Figure 1:
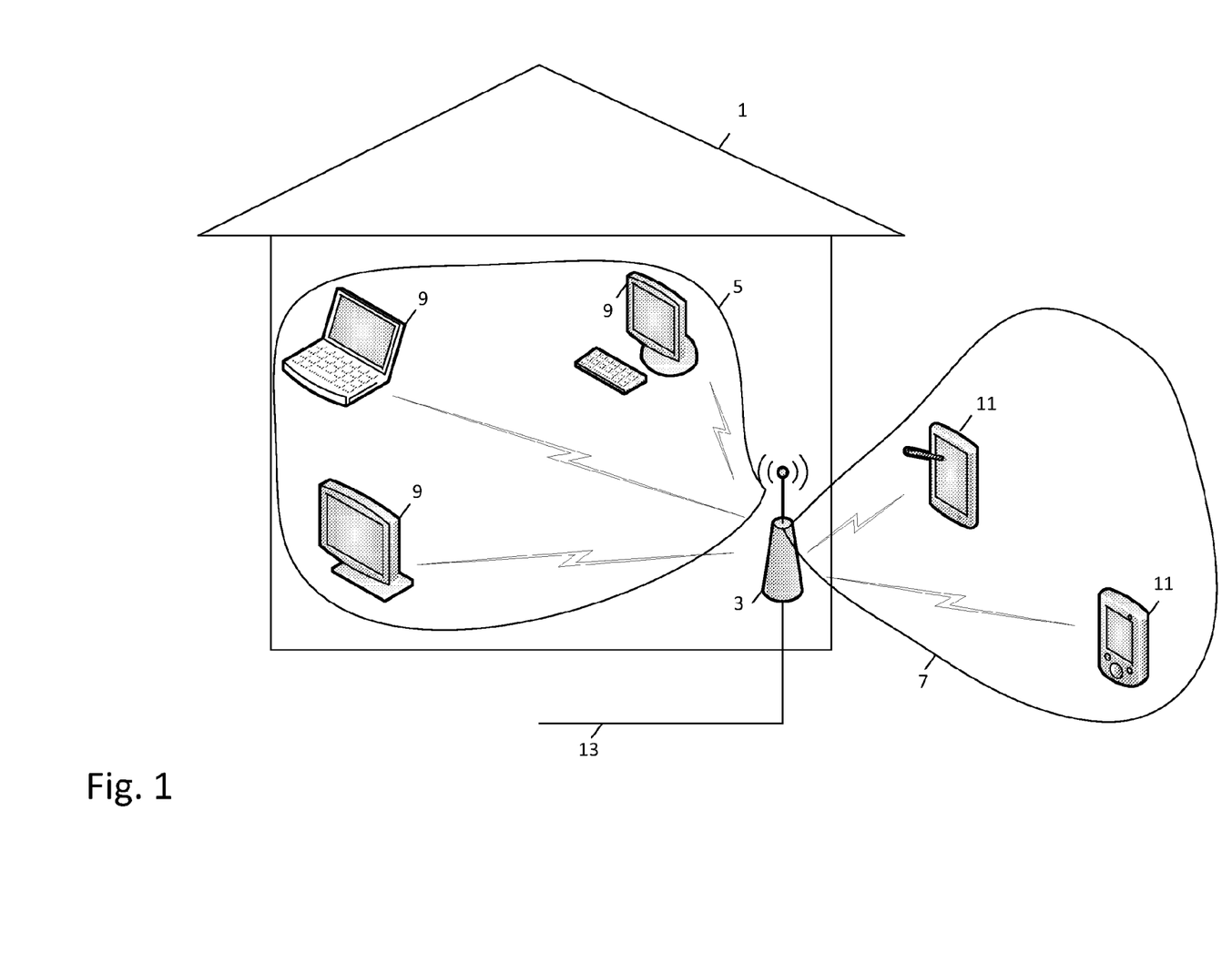
FIG. 1 schematically shows an example home network having an access point in accordance with a first embodiment.

FIG. 1 shows a home 1 containing a wireless access point 3 which provides data access for local devices to a Wide Area Network such as the Internet via an xDSL link 13. The wireless access point 3 is configured to generate a primary, "home", Wireless Local Area Network (WLAN) 5 and a secondary, "guest", WLAN 7 so that devices can connect to the wireless access point 3.

Both wireless networks 5, 7, are created in accordance with the IEEE 802.11n WiFi protocols in the 2.4 Ghz frequency range. In this embodiment, the home WLAN 5 is a private network for use by a number of home devices 9 and access is restricted/protected using the WiFi Protected Access 2 (WPA2) encryption access protocol so that only the home devices 9 having knowledge of a user defined passkey can join the home WLAN 5. The guest network is for use by visitors to the home 1 and therefore is either Open/unencrypted or set to have a different, weaker password than that of the home WLAN 5.

For ease of explanation, the home WLAN 5 and the guest WLAN 7 are shown covering two different geographical zones, however, the home WLAN 5 and the guest WLAN 7 actually have similar/overlapping ranges since they emanate from the same point (the access point) in all directions.

As shown in FIG. 1, the home devices 9 connect to the home WLAN 5 and a set of guest devices 11 connect to the guest WLAN 7. As is conventional, the home WLAN 5 and the guest WLAN 7 have different network names (SSIDs) so that they can be differentiated by users and the wireless access point 3 controls the data flow between the various devices such that home WLAN 5 connected devices 9 can access the WAN and other home WLAN devices 9 while the guest network devices 11 can only access the WAN. The access point is configured such that home network devices 9 cannot see any of the guest devices 11 and guest network devices 11 cannot see any devices 9 connected to the home WLAN 5.

Furthermore the amount of bandwidth available to the guest network via the xDSL connection is restricted at the network layer of the network protocol stack so that the devices 9 on the home network have priority, for example, if the xDSL connection 13 has a bandwidth of 24 Mbs, the secondary guest network will be allocated a maximum bandwidth of 2 Mbs from the 24 Mbs.

In 2.4 Ghz WiFi there are only 13 usable channels and in this embodiment, the home WLAN 5 and guest WLAN 7 are configured to use the same wireless channel since two different channels would occupy more spectrum and may cause extra interference to neighboring wireless networks.

However, with this configuration, only one of the home WLAN 5 and guest WLAN 7 may transmit data over the radio link at any given moment due to the nature of the carrier sense multiple access with collision avoidance (CSMA/CA) collision algorithm used by IEEE 802.11 wireless devices. Therefore, even though the guest WLAN 7 is the lower priority network, when a wireless device 11 is transmitting data, a home device 9 connected to the home network 5 cannot interrupt the transmission until the guest device 11 has completed transmitting its data or a transmission window has expired. The home device must repeatedly listen to the channel for activity until the guest device 11 has finished transmitting and the WiFi channel is clear.

Furthermore, the signal strength and link quality between an access point 3 and a wireless device decreases with distance and therefore for robustness, the speed of data transfer between the client and the access point will also decrease. The rate of maximum data transfer is quantized into several supportable rate bands. For example, 1 Mbps, 2 Mbps, 5 Mbs, 11 Mbs, 22 Mbps, 42 Mbs, 54 Mbs and 72 Mbps. Although 802.11n is capable of much higher data rates, for ease of explanation, the first embodiment will describe only a limited number of data rates. The access point 3 can advertise which rates are supported and the devices choose a rate based on a measure of their own signal strength.

Therefore the delay in transmission for home devices 7 is increased if the guess device 11 is physically located on an edge of the guest WLAN's 7 network range and therefore must transmit at a low data rate.

In this embodiment, the wireless access point 3 is capable of supporting data rates between 1 Mbps and 54 Mbps for both the home WLAN 5 and the guest WLAN 7 and the home devices 9 and guest devices 11 are configured to select one of the supported data rates based on the signal strength to the wireless access point 3.

Figure 2:
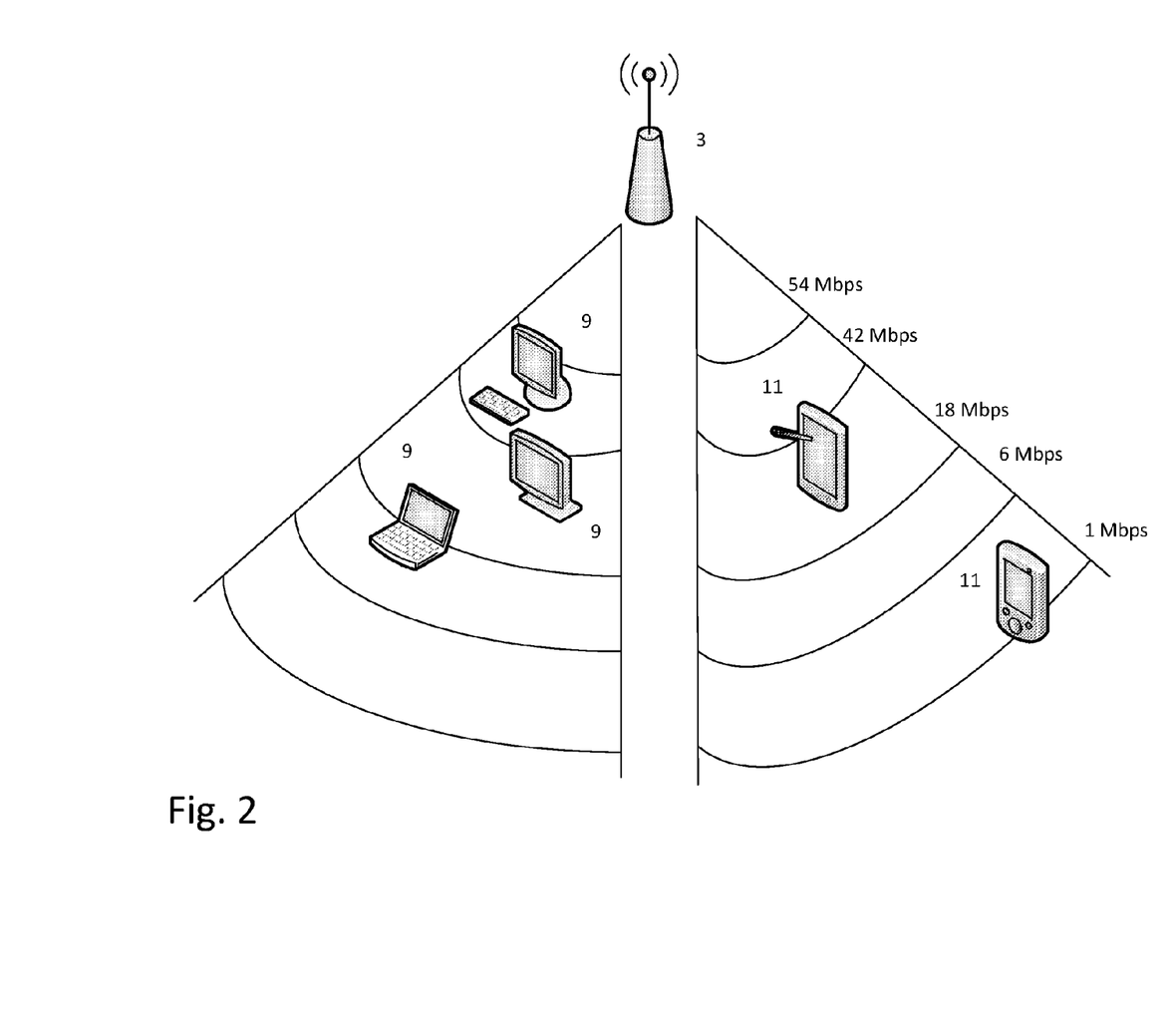
FIG. 2 schematically shows a plot of the network signal strength of the wireless link from each device to the access point.

FIG. 2 shows a plot of data rates used by the home devices 9 and guest devices 11 which are connected to the access point 1 shown in FIG. 1. Generally, the home devices 9 are located closer to the wireless access point 3 and have a high signal link quality connection. They are therefore able to use any of the supportable rate bands and for performance reasons the devices choose a modulation scheme which results in a fast link rate of between 36 and 54 Mbps.

For the guest network 7, one of the devices is located close to the wireless access point and therefore can connect to the wireless access point 3 with a high data rate. However, another guest device 11 is located at the edge of the guest WLAN 7 range. The standard behavior in WiFi is to favor robustness of the link over less reliable but faster data rates and therefore the guest device 11 chooses to connect to the access point 3 at a 1 Mbps link rate.

In this network arrangement, this guest device can take at least thirty-six times longer to transmit the same amount of data as the other devices connected to the wireless access point 3.

To prevent the presence of a slow client device 11 connected to the secondary guest WLAN 7 degrading the performance of the home devices 9 connected to the home network 5, the access point 3 in the first embodiment the invention describes a new wireless access point function that monitors the current state of connected home network devices 9 and uses this information to dynamically update and adjust the lowest or 'basic/mandatory' data rate offered on the guest WLAN 7 to guest network devices 11. This ensures slower secondary users cannot connect and disproportionally reduce available channel bandwidth with transmissions that occupy a large proportion of air time.

Figure 3:
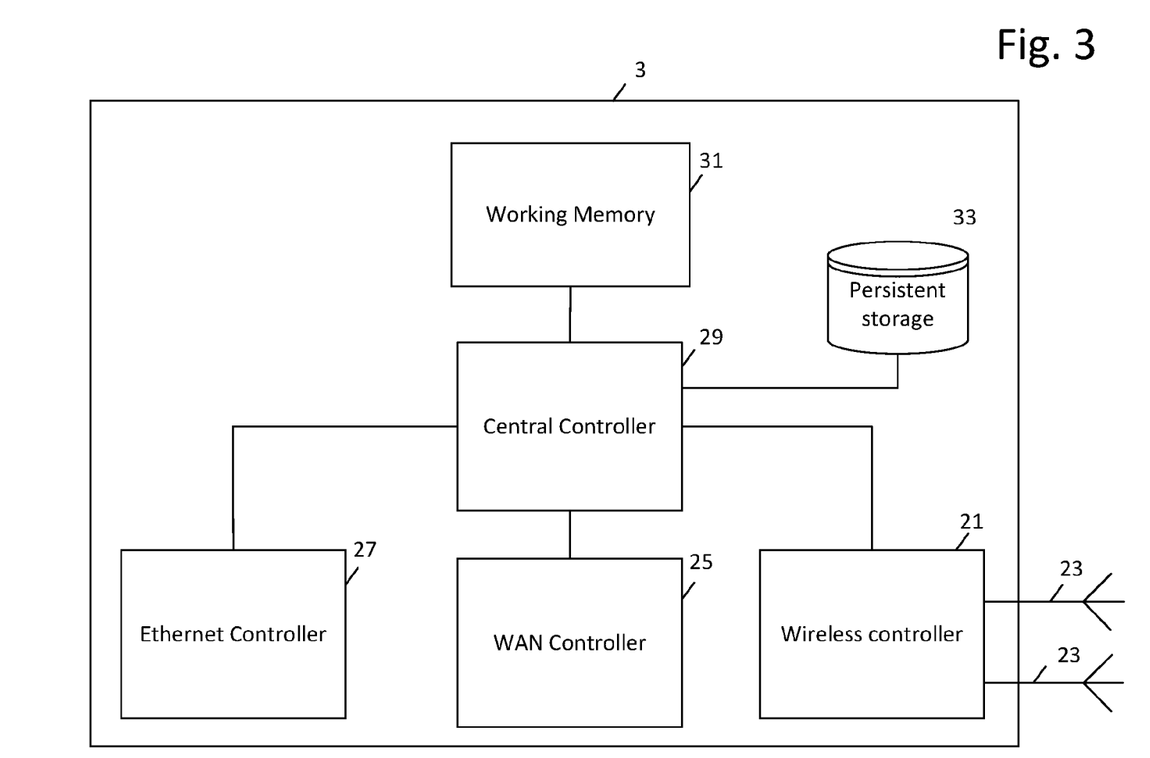
FIG. 3 shows a block diagram of the physical components of the access point.

FIG. 3 shows the components of a wireless access point device 3. For connectivity, the wireless access point 3 has a wireless interface 21 connected to a number of antennas 23, a WAN interface 25 for connecting to an external network such a corporate network, ISP network core or the Internet using xDSL or cable, and a wired network interface 27 for connecting to any Ethernet based network devices.

A central controller 29 is responsible for the overall operation of the wireless access point 3 and the various components. The central controller 29 operation is configured using computer program instructions stored in working memory 31 and persistent storage 33.

When the central controller 29 is operating in accordance with the computer program instructions, it can be viewed as a number of functional components.

Figure 4:
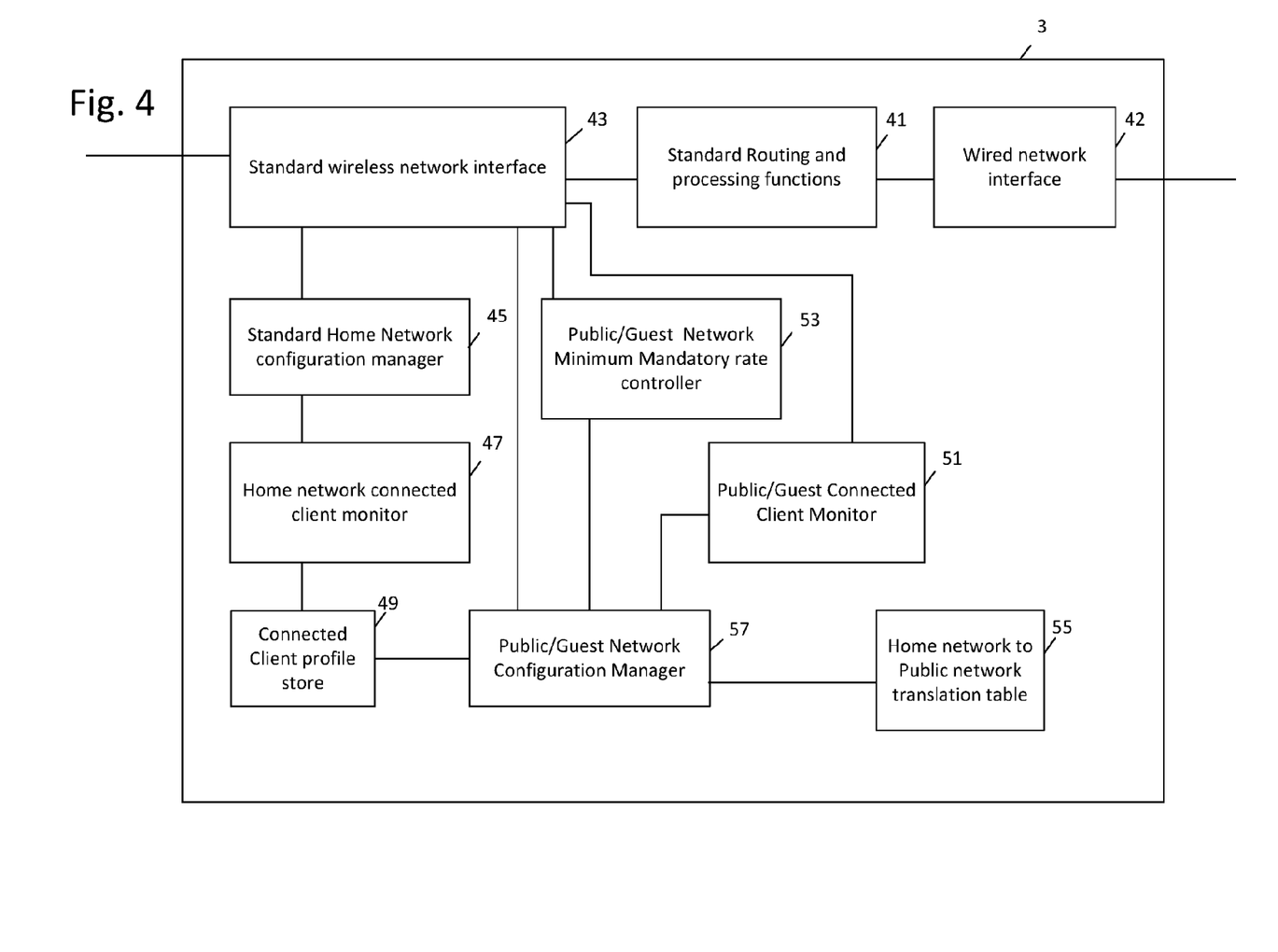
FIG. 4 schematically shows the functional components of the access point.

FIG. 4 shows the functional components of the wireless access point 3 in the first embodiment.

The wireless access point 3 includes a number of conventional functional components such as routing and processing functions 41, wired network interface functions 42 (for LAN and WAN), wireless network interface functions 43 and a home network configuration manager 45. The radio interface functions provide the home WLAN 5 and guest WLAN 7 over the 2.4 Ghz WiFi band and the home network configuration manager 45 provides the settings for the home WLAN 5 generated by the radio interface function 43. Similarly, a guest network configuration manager 57 manages the guest network 7.

In order to change the configuration of the guest WLAN 7 in dependence on the performance of the home clients 9 connected to the home WLAN 5, the wireless access point 3 further includes a home network connected client monitor 47, a connected client profile store 49, a guest connected client monitor 51, a guest network minimum mandatory rate controller 53, and a home network to guest network translation table 55 in addition to the guest network configuration manager 57.

The home network connected client monitor 47 is configured to monitor the home WLAN 5 for any home devices 9 and store information about the connected home clients 9 in the connected client profile store 49. The connected client profile store 49 contains average values for the monitored values over a sample period of several seconds. The main role of these components is to determine the rate of the slowest home device 9 which determines the lowest or basic/mandatory rate offered by the wireless access point 3 on the guest network 7.

Information relating to the slowest or least efficient home client 9 is passed to the guest network configuration manager 57 which accesses the network to guest network translation table 55 containing a set of administrator defined mappings for supportable rates to determine the appropriate basic rate for the guest network.

The guest network configuration manager 57 passes the determined rate to the guest network minimum mandatory rate controller 53 which configures the guest network parameters used by the radio interface function 43.

To ensure the user experience is not degraded significantly, the guest connected client monitor 51 is used to monitor which guest devices 11 are present and the processing of the guest network configuration manager 57 is only performed when there are no guest devices 11 connected to the guest network 7.

Figure 5:
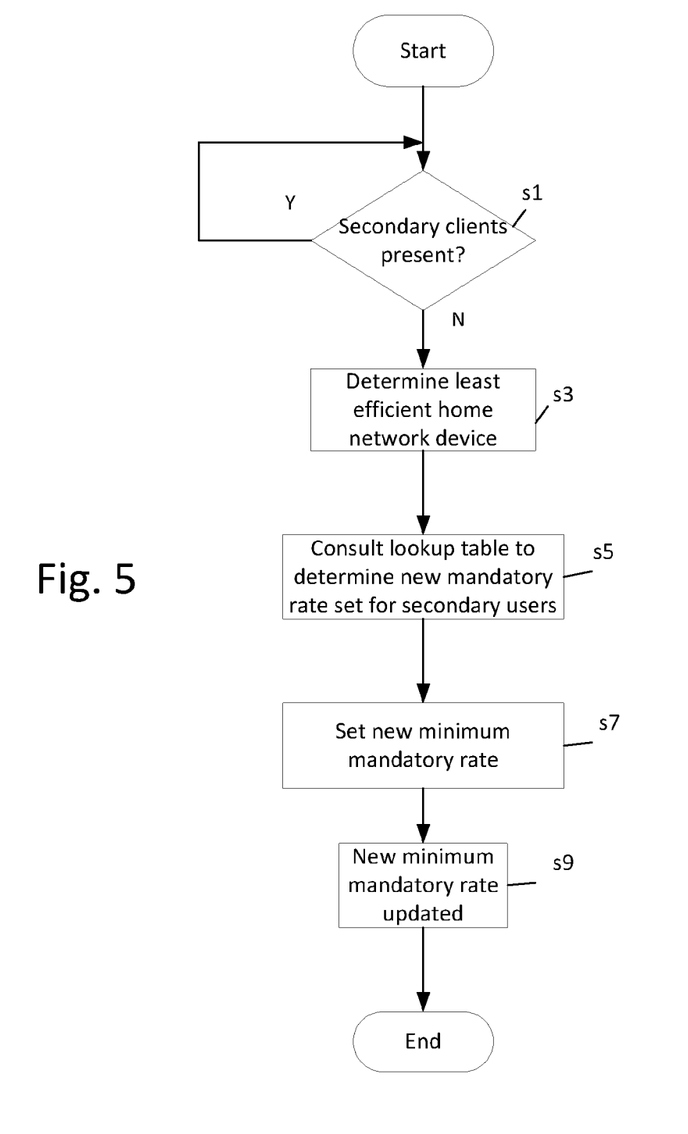
FIG. 5 is a flowchart of the operation of the access point.

FIG. 5 is a flowchart of showing the operation of the various components of the wireless access point 3 in more detail.

In s1, a test is performed by the guest network connected client monitor 51 to determine if there are any guest network clients 11. If there are, then the subsequent processing is postponed so that any currently connected guest devices 11 are not affected.

If there are no guest network client devices 11 then in s3, the home network connected client monitor 47 determines the least efficient home network device 9. An example of the information stored in the connected client profile store 49 is shown below.

TABLE 1

| Client | Average modulation/ data rate (Mbps) | Average channel occupancy | Average data rate requirement (Mbps) | Mandatory rate controller algorithm |
|---|---|---|---|---|
| Device 1 | 24 | 4% | 1.0 | Active |
| Device 2 | 48 | 3% | 1.0 | Active |
| Device 3 | 6 | <1% | <0.1 | Ignore - low activity |
| Device 4 | 9 | 14% | 1.0 | Most inefficient user |

In this example, although Device 3 is connected at the slowest data rate, it is not active on the home WLAN 5. Therefore device 4 is deemed to be the slowest data rate active device and is therefore the most inefficient device connected to the home WLAN 5 with an average modulation rate of 9 Mbps. Therefore in s5 the guest network mandatory rate controller accesses the home network to guest network translation table 55 to determine an appropriate rate for the guest network. An example translation table is shown below.

TABLE 2

| Minimum user data rate on primary (home) network (Mbps) | Minimum mandatory rate set for secondary (guest) network (Mbps) |
|---|---|
| 72 | 54 |
| 54 | 48 |
| 48 | 36 |
| 36 | 24 |
| 24 | 18 |
| 18 | 12 |
| 12 | 9 |
| 11 | 7.5 |
| 9 | 6 |
| 6 | 5.5 |
| 5.5 | 2 |
| 2 | 1 |
| 1 | 1 |
| No users | 1 |

In this example, device 4 has connected at the lowest data rate on the home WLAN at 9 Mbps and therefore the translation table 55 returns a new minimum mandatory rate of 6 Mbps for the guest network. In s7 the guest network minimum mandatory rate controller 53 sets the new determined minimum mandatory rate for the guest network 7, and in s9 the radio interface functions 43 set the new minimum mandatory rate and processing ends.

With the new minimum mandatory rate for the guest network 7, any guest network devices 11 which cannot meet the new rate will not be able to join the guest network 7 which will minimize the impact of a slow guest network connection on the devices 9 on the home network 5. Although the minimum mandatory rate is set to be slightly lower than the slowest device 9 connected to the home network 5, in the conventional manner, any guest devices 11 which are capable of connecting at higher data rates will still be able to choose higher rates since it is only the minimum mandatory rate which is changed.

The processing of FIG. 4 may be triggered at periodic intervals or whenever a new device connects to the home WLAN 5.

In the first embodiment, the configuration management function for the secondary network dynamically sets the mandatory minimum data rate that is advertised such that secondary users who would otherwise connect at low data rates (due to proximity to the access point) are prevented from connecting and degrading the overall system/channel performance.

Alternatives/Modifications

In the first embodiment, the secondary network is a personal guest network. The same processing by the various components of the wireless access point can be applied in a case where the secondary network is a public hotspot which is also configured to be dependent on the devices connected to the primary network. An example of such a configuration is a British Telecommunications plc Home hub 4 access point arranged to provide a BT FON secondary network. In this case secondary network devices are likely to be mobile roaming users which will only be connected to the wireless access point for a short period of time.

In the first embodiment, the wireless networks are 2.4 Ghz WiFi networks. In an alternative, the wireless access point is configured to provide 5 Ghz WiFi networks. In a further alternative, the wireless access point has both 2.4 Ghz and 5 Ghz home and secondary networks. With pairs of home/guest networks in the 2.4 Ghz and 5 Ghz ranges. Slow devices on one home network frequency will affect just one secondary network's advertised speeds so that secondary users are more likely to connect to the other secondary network which has less primary network devices.

In the embodiment, the wireless access point created wireless networks in accordance with the IEEE 802.11 WiFi protocols, in an alternative other wireless protocols can be used.

In the embodiment, the mandatory rate of the secondary network is changed in accordance with the determination of the least efficient primary network device. In an alternative, the determination is based on a set of least efficient primary network devices, for example the ⅓ slowest devices.

In the embodiment, the minimum rate for the secondary network is determined by consulting a lookup table. In an alternative, there are a number of lookup tables which can be selected to suit different conditions. For example, the table shown in the embodiment can be used during "off-peak" hours when few users are on the primary network, while a table which is more aggressive in locking out secondary users can be used during peak times. Similarly, the network administrator may wish to explicitly set the look up table used due to the location or scenario in which the wireless access point is deployed.

In the embodiment, the minimum rate for the secondary network is determined by consulting a lookup table. In an alternative, there is no look up table and the guest network minimum mandatory rate controller calculates a rate for the secondary network using an algorithm, for example:

Secondary rate=rate of least efficient primary network device, or

Secondary rate=rate of least efficient primary network device−1 data rate band.

In a further alternative, several algorithms for determining the minimum mandatory data rate can be used in accordance with the value of the slowest data rate. For example, if the slowest active device is at a high data rate such as 72 Mbps and 54 Mbps, then the minimum mandatory data rate on the secondary network must be the same as the slowest primary network data rate, but if the slowest active device is lower than 22 Mbps then the minimum mandatory data rate can be one or two values lower.

In a further alternative, the guest network minimum mandatory rate controller can be configured to use different rate setting algorithms in different contexts such as time of day.

In the embodiment the lowest connected data rate was used to calculate the minimum mandatory data rate of the secondary network, in an alternative other usage parameters can be taken into consideration for determining the minimum mandatory data rate.

The invention claimed is:

1. A method of operating a wireless access point device having a wireless network interface configured to generate a primary wireless network for a plurality of wireless client devices, and a secondary wireless network, the primary wireless network and the secondary wireless network configured to operate at the same wireless frequency, the method comprising a wireless network controller performing a method comprising:
accessing a set of connection speed data rate values relating to a current connection speed of each of the plurality of wireless client devices to the primary wireless network;
identifying a lowest data rate from the set of connection speed data rate values;
determining a minimum connection speed value for the secondary wireless network, the minimum connection speed value being dependent on a value of the identified lowest data rate on the primary wireless network; and
modifying the wireless network interface so that, when a request by a further wireless client device to connect to the secondary network is received, a response by the wireless network interface excludes connection data rates which are lower than the determined minimum connection speed value for the secondary wireless network, such that the further wireless client device will only connect to the secondary wireless network if the further wireless client device is able to connect at or above the determined minimum connection speed value.

2. The method according to claim 1, wherein the determination of a minimum connection speed value comprises accessing a lookup table in a data store of the wireless access point device, the lookup table containing mappings between data rates of the primary network and corresponding minimum connection speed values for the secondary network.

3. The method according to claim 2, wherein the data store contains a plurality of lookup tables, each lookup table having a different mapping between data rates of the primary network and minimum connection speed values for the secondary network, and wherein one of the plurality of lookup tables is accessed in accordance with a current time.

4. The method according to claim 1, wherein the determination of the minimum connection speed value for the secondary network comprises calculating the minimum connection speed value in accordance with a predetermined algorithm.

5. The method according to claim 1, further comprising monitoring usage parameters relating to the plurality of connected wireless client devices to the primary wireless network and updating the set of connection speed data rate values.

6. The method according to claim 1, wherein the primary wireless network is a private network of the wireless access point device for private network users and the secondary wireless network is a public hotspot network.

7. An apparatus comprising:
a wireless network interface configured to generate a primary wireless network for a plurality of wireless client devices, and a secondary wireless network, the primary wireless network and the secondary wireless network configured to operate at the same wireless frequency;
a network monitor for accessing a set of connection speed data rate values relating to a current connection speed of each of the plurality of wireless client devices to the primary wireless network;
an identifier for identifying a lowest data rate from the set of connection speed data rate values;
a determiner for determining a minimum connection speed value for the secondary wireless network, the minimum connection speed value being dependent on a value of the identified lowest data rate on the primary wireless network; and
a modifier for modifying the wireless network interface so that, when a request by a further wireless client device to connect to the second network is received, a response by the wireless network interface excludes connection data rates which are lower than the determined minimum connection speed value for the secondary wireless network, such that the further wireless client device will only connect to the secondary wireless network if the further wireless client device is able to connect at or above the determined minimum connection speed value.

8. The apparatus according to claim 7, further comprising a data store storing a lookup table containing mappings between data rates of the primary network and corresponding minimum connection speed values for the secondary network, wherein the determiner is operable to access the lookup table to determine the minimum connection speed value.

9. The apparatus according to claim 8, wherein the data store contains a plurality of lookup tables, each lookup table having a different mapping between data rates of the primary network and minimum connection speed values for the secondary network, and wherein the determiner is operable to access one of the plurality of lookup tables in accordance with a current time.

10. The apparatus according to claim 7, wherein the determiner is operable to calculate the minimum connection speed value in accordance with a predetermined algorithm.

11. The apparatus according to claim 7, wherein the network monitor is configured to monitor usage parameters relating to the plurality of connected wireless client devices to the primary wireless network and update the set of connection speed data rate values.

12. The apparatus according to claim 7, wherein the primary wireless network is a private network of a wireless access point for private network users and the secondary wireless network is a public hotspot network.

13. A wireless network system comprising:
the apparatus as set out in claim 7 having a primary wireless network and secondary wireless network;
a first set of wireless client devices connected to the primary wireless network; and
a second set of wireless client devices which are connectable to the secondary wireless network.

* * * * *